Jan. 19, 1937.  F. W. SCHWINN  2,068,474
HANDLE BAR CONSTRUCTION
Filed June 1, 1936
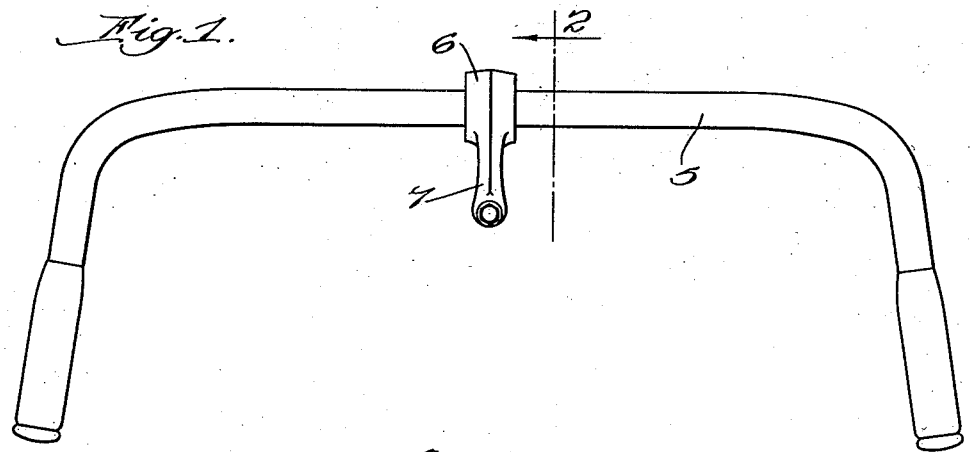
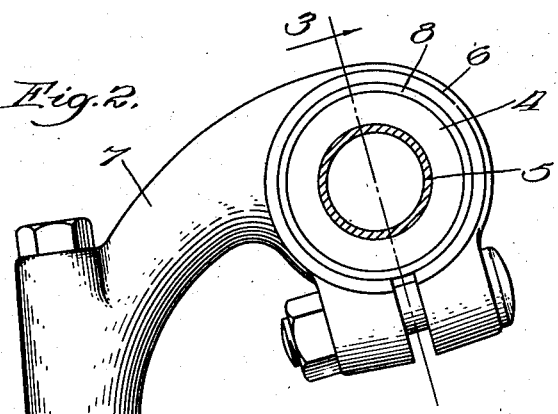
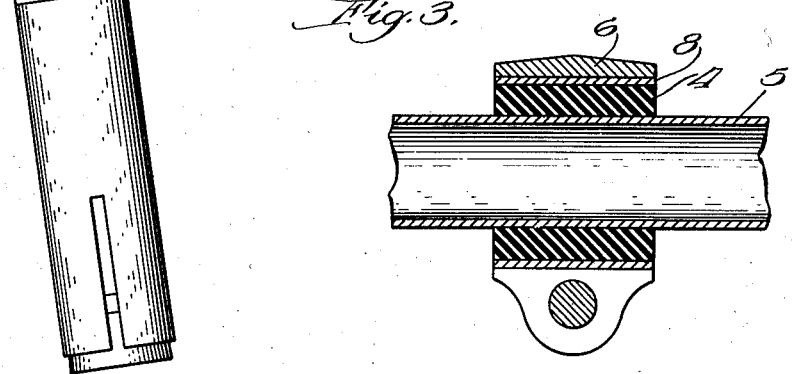
Inventor:
Frank W. Schwinn,
By Dyrenforth, Lee, Chritton & Wiles.
Attys.

Patented Jan. 19, 1937

2,068,474

UNITED STATES PATENT OFFICE 2,068,474

HANDLE BAR CONSTRUCTION

Frank W. Schwinn, Chicago, Ill.

Application June 1, 1936, Serial No. 82,991

5 Claims. (Cl. 208—115)

My invention relates more particularly to the handle bars of cycles as for example bicycles.

One of my objects is to provide for the support of the handle bar in such a way as to minimize the transmission of vibrations and shocks to the handle bar in the movement of the cycle over rough roads.

Another object is to provide a novel, simple and inexpensive construction for this purpose.

Another object is to provide a handle bar and cushion assembly which will lend itself to adjustment in the clamping device of a handle-bar stem as in the case of handle bars as commonly provided; and other objects as will be manifest from the following description.

Referring to the accompanying drawing:

Figure 1 is a plan view of a handle bar and handle-bar stem assembly embodying my invention.

Figure 2 is an enlarged sectional view taken at the line 2 on Fig. 1 and viewed in the direction of the arrow; and Figure 3, a fragmentary sectional view taken at the line 3 on Fig. 2 and viewed in the direction of the arrow.

Generally stated my invention involves the provision of a body 4 of cushioning material, as for example and preferably rubber, between the handle-bar 5, mid-way of its ends, and the split clamp portion 6 of a handle-bar stem 7, and as is commonly provided in practice.

According to the preferred illustrated embodiment of my invention, I provide the cushioning material as a part of a handle-bar assembly, the cushioning material being provided of ring form as shown and surround it with a ring 8 preferably of metal, as for example steel, the bar 5, cushioning ring 4 and ring 8 being held together to form a unit adapted to be inserted into the clamp-portion 6 of the handle-bar stem 7 thus permitting this unit assembly to be rotatably adjusted in the clamp-portion 6, into any desired position, without disturbing the relationship of the cushioning material to the handle bar.

The cushioning material is preferably of rubber vulcanized to such a degree of hardness as to render it best adapted for the cushioning purpose, as will be understood by those skilled in the art.

In accordance with this preferred embodiment of the invention, the rubber cushioning material 4, to secure the desired combining of the handle bar 5, cushioning material 4, and outer ring 8 to form a unit assembly, is vulcanized to both the handle bar 5 and ring 8, throughout the inner and outer peripheral areas of the ring 4, these metal parts, by way of example, being brass plated, to insure a good bond between them and the rubber.

As a desirable procedure to follow in producing the construction, the handle bar 5, with the ring 8 surrounding it in spaced relation and uncured rubber of the desired compounding placed in the space between the handle-bar 5 and ring 8, is enclosed in a vulcanizing mold and the rubber vulcanized in compressed condition, it being understood that the degree of cushioning action afforded by the construction is dependent on any one or more of many factors, as for example the thickness of the ring of cushioning material, the particular rubber compound used, the controlling of the cure of the rubber, and the degree to which the rubber, while undergoing vulcanization, is compressed, but as the particular degree of resiliency of the cushion is not of the essence of my invention, the factors controlling the degree of cushioning action, may be varied as desired within the invention.

While I have illustrated and described a particular embodiment of my invention, I do not wish to be understood as intending to limit it thereto as the same may be variously modified and altered without departing from the spirit of my invention.

What I claim as new, and desire to secure by Letters Patent, is:

1. A handle-bar and cushion assembly comprising a handle-bar, a ring surrounding said bar and spaced therefrom, and a body of rubber cushioning material in the space between, and vulcanized to, said bar and ring.

2. A handle-bar and cushion assembly comprising a handle-bar, a ring surrounding said bar and spaced therefrom, and a ring of rubber cushioning material in the space between, and vulcanized to, said bar and ring.

3. In combination, a handle-bar stem having a clamp portion, a handle-bar, a ring surrounding said bar and spaced therefrom, and cushioning material in the space between said bar and ring, said clamp portion surrounding said ring and clamped thereto to hold said bar in position on said stem.

4. In combination, a handle-bar stem having a clamp portion, a handle-bar, a ring surrounding said bar and spaced therefrom, and cushioning material in the space between said bar and ring, said bar, ring, and cushioning material being secured together and as a unit relatively adjustable in said clamp portion and said clamp portion clamping said ring for holding said bar in position on said stem.

5. In combination, a handle-bar stem having a clamp portion, a handle-bar, a ring surrounding said bar and spaced therefrom, and a body of cushioning rubber in the space between said bar and ring and vulcanized thereto, whereby said bar, ring, and body are rotatably adjustable as a unit in said clamp portion, said clamp portion clamping said ring for holding said bar in position on said stem.

FRANK W. SCHWINN.